United States Patent
Ashley et al.

(10) Patent No.: US 6,486,248 B2
(45) Date of Patent: Nov. 26, 2002

(54) LIQUID COLORANT AND METHOD

(75) Inventors: David E. Ashley, Moore, SC (US); Leonard J. Starks, Duncan, SC (US); Paul D. Halphen, Spartanburg, CA (US)

(73) Assignee: Milliken & Company, Spartanburg, SC (US)

( * ) Notice: Subject to any disclaimer, the term of this patent is extended or adjusted under 35 U.S.C. 154(b) by 112 days.

(21) Appl. No.: 09/756,445

(22) Filed: Jan. 8, 2001

(65) Prior Publication Data

US 2002/0091183 A1 Jul. 11, 2002

(51) Int. Cl.⁷ .............................. C08K 5/08; C08K 5/01
(52) U.S. Cl. ................... 524/358; 524/474; 106/285; 106/400; 106/493
(58) Field of Search .................. 106/285, 400, 106/493; 524/358, 474

(56) References Cited

U.S. PATENT DOCUMENTS

| | | | |
|---|---|---|---|
| 2,721,111 A | 10/1955 | Long et al. ........................ | 8/26 |
| 3,476,500 A | 11/1969 | Litke ................................ | 8/93 |
| 3,690,809 A | 9/1972 | Orelup ............................. | 8/6 |
| 4,056,367 A | 11/1977 | Arsac et al. ..................... | 44/59 |
| 4,155,740 A | 5/1979 | Capozza ......................... | 71/28 |
| 4,285,693 A | 8/1981 | Lamm et al. ................... | 8/521 |
| 4,378,969 A | 4/1983 | Hansen et al. ................. | 8/521 |
| 4,430,090 A | 2/1984 | Bühler et al. .................. | 8/508 |
| 4,468,254 A | 8/1984 | Yokoyama et al. ........... | 106/271 |
| 4,473,376 A | 9/1984 | Hansen et al. ................. | 8/639 |
| 4,804,403 A | 2/1989 | Moore ............................ | 71/28 |
| 5,157,067 A | * 10/1992 | Burditt et al. ................ | 524/270 |
| 5,290,962 A | 3/1994 | Ozdoba et al. ................ | 554/156 |
| 5,300,135 A | 4/1994 | Hudson et al. ................ | 71/28 |
| 5,308,395 A | * 5/1994 | Burditt et al. ................ | 106/500 |
| 5,423,897 A | 6/1995 | Hudson et al. ................ | 71/28 |
| 5,428,137 A | 6/1995 | Otsuka et al. ................. | 534/792 |
| 5,466,274 A | 11/1995 | Hudson et al. ................ | 71/28 |
| 5,472,712 A | 12/1995 | Oshlack et al. ............... | 424/480 |
| 5,697,984 A | 12/1997 | Swatzina et al. ............. | 8/527 |
| 5,746,022 A | 5/1998 | Brown et al. ................. | 47/57.6 |

* cited by examiner

Primary Examiner—Kriellion A. Sanders
(74) Attorney, Agent, or Firm—Terry T. Moyer; Thomas L. Moses

(57) ABSTRACT

A solvent free, diluent free, hydrocarbon soluble liquid polymeric colorant. Also disclosed is a method for applying a liquid colorant to solid granular substrates, such as fertilizer, to provide a colored substrate where the colorant exhibits a reduced tendency to bleed or migrate from the surface of the colored substrate onto other surfaces.

17 Claims, No Drawings

LIQUID COLORANT AND METHOD

BACKGROUND

Field of the Invention

The present invention relates to a solvent free, diluent free, hydrocarbon soluble liquid colorant, as well as a method for applying the colorant to solid granular substrates. More specifically, the invention includes a method for applying a liquid colorant to fertilizer to provide a colored fertilizer where the colorant exhibits a reduced tendency to bleed or migrate from the surface of the fertilizer onto other substrates. Colored fertilizer is useful in many applications where it is necessary to see where the fertilizer has already been applied, so that an even coating may be applied to a specific area. If too much fertilizer is added to a lawn, for instance, the grass may die as a result. If too little fertilizer is added, the desired result of healthy grass is not achieved.

Heretofore, methods of coloring solid granular substrates, such as fertilizer containing hydrocarbon components for use as binders or dedusting agents, have included the use of pigments and solvent dyes. These colorants are generally diluted with a polybutene and sprayed onto the fertilizer. The polybutene, which serves primarily as a dedusting agent, also disperses the color and helps to bind the active ingredients of the colorant to the fertilizer. Solvent dyes or pigments, which have been dissolved or emulsified in some solvent or diluent, are generally added to a dedusting agent, such as polybutene, and are then sprayed onto the fertilizer. Optionally, an herbicide, such as Atrazine, may be added to the fertilizer. The use of such colorants presents certain problems. First, solvent dyes tend to stain the plastic bags that are used to package the fertilizer. Also, if the colorant contains any constituents that are hydroscopic, the fertilizer tends to clump and cause processing problems in the bagging process. Pigments provide non-migrating colors, but are generally not soluble in a dedusting agent or binder. Solvents, on the other hand, are soluble in the dedusting agent or binder, but have the migration problems mentioned above.

Thus, it would be advantageous to provide a liquid, polymeric, non-staining colorant that is soluble in a hydrocarbon medium, and which contains no hydroscopic components. Further, it would be advantageous to provide a method for coloring fertilizer that eliminates or significantly reduces the use of solvents and diluents, which may be harmful to the environment, and which add substantial cost to the coloring process.

OBJECTS OF THE INVENTION

Accordingly, it is an object of the present invention to provide a solvent free, diluent free, hydrocarbon soluble liquid polymeric colorant that may be applied directly to a solid granular substrate, such as fertilizer, where the colorant has a reduced tendency to migrate into or onto other substrates.

It is another object of the present invention to provide a liquid polymeric colorant that may be applied to fertilizer without the use of solvents or diluents.

Yet another object of the present invention is to provide a liquid polymeric colorant having low viscosity in pure form.

Still another object of the present invention is to provide a method for coloring solid granular substrates so that the colorant does not migrate off of the substrates and stain other surfaces with which it comes into contact.

Another object of the present invention is to provide a method for coloring solid granular substrates, such as fertilizer, that eliminates the use of solvent dyes and pigments, and also eliminates or significantly reduces the use of solvents and diluents.

Yet another object of the present invention is to provide a method for coloring fertilizer that is less costly than other coloring methods, and which avoids other problems associated with current techniques for coloring fertilizer.

These and other aspects and advantages of the present invention will become apparent in the specification and the appended claims.

DESCRIPTION

In a first embodiment, the liquid polymeric colorant is formed from a chromophore and an alcohol having about three to about thirty carbon atoms. The chromophore may be an azo, TPM, methane, anthraquinone, or any combination thereof. The alcohol may be substituted with any of the following: an alkoxylated alcohol, fatty acid, amine, amide, ester of alkoxylated fatty alcohol, an alkoxylated triglyceride, a mono-, di-, or tri-ester of an alkoxylated triglyceride, an alkoxylated polyhydric alcohol or esters thereof, or a polyether carboxylate or esters thereof, having a HLB of 4–11.

The viscosity level of the colorant described in the first embodiment is below 2000, preferably below 1,000, and is most preferably in the range of 550–650 cps, according to the standard viscosity test for Brookfield viscosity measurement using the Brookfield digital viscometer Model LVT DV-11. The molecular weight of the colorant described in the first embodiment ranges between 1200–1500. The colorant described in the first embodiment is soluble in a polybutene medium.

In a second embodiment, the colorant consists of (A) a chromophore (same as above), (B) a fatty acid used to cap the reactive groups of the alkoxylate, (C) a polyalkoxy group with reactive end sites such as hydroxyls or amines, and (D) a low viscosity diluent from the group comprising a fatty acid containing 10–20 carbons in its chain, a fatty ester containing 10–20 carbons in its acid chain and 1–10 carbons in its ester chain, a propoxylated aniline containing 5–10 propylene oxide groups, a propoxylated aniline containing 5–10 propylene oxide groups capped with a fatty acid containing 10–20 carbons in its chain, and polybutene or other hydrocarbon diluents.

Other alternative embodiments include polymeric colorants containing EO (ethylene oxide), PO (propylene oxide), or EO/PO random or block copolymers ranging from 2–20 repeating units, which are end capped with fatty acids containing carbons ranging from 10–20 units. It should be noted that none of the embodiments disclosed herein include any hydroscopic constituents.

In order to apply the colorant to the fertilizer or other solid granular substrate, the colorant is added to an oleophilic binder, such as Indopol L-14 or polybutene. The oleophilic binder may also serve as a dedusting agent. The combination of the colorant and the binder is then applied to the fertilizer by means of spraying, dipping, dry tumbling, or any other suitable method.

While preferred embodiments have been disclosed and described in considerable detail, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for coloring solid granular substrates, said method comprising the steps of:
   providing a solvent free, diluent free, liquid hydrocarbon soluble colorant having a viscosity level of less than 1000 cps;
   adding said colorant to an oleophilic binder; and
   applying said colorant and said binder to a solid granular substrate.

2. The method set forth in claim 1, wherein said colorant contains a molecular structure having a group sequence including a polar group positioned between two non-polar groups.

3. The method set forth in claim 2, wherein said colorant is disposed in a non-polar medium.

4. The method set forth in claim 3, wherein said non-polar medium is selected from the group consisting of aromatic, oleophenic, and aliphatic oils.

5. The method set forth in claim 1, wherein said oleophilic binder is Indopol L-14.

6. The method set forth in claim 1, wherein said oleophilic binder is polybutene.

7. The method set forth in claim 1, wherein said colorant is red oleate.

8. The method set forth in claim 1, wherein said liquid colorant is 100% soluble in a hydrocarbon medium.

9. The method set forth in claim 1, wherein said liquid colorant includes chromophores selected from the group consisting of azo, TPM, methine, anthraquinone, or any combination thereof.

10. The method set forth in claim 1, wherein said liquid colorant includes an alcohol having a carbon chain of C3–C30.

11. The method set forth in claim 1, wherein said liquid colorant includes at least one reactive group selected from the group consisting of alkoxylated alcohol, fatty acid, amine, amide, ester of alkoxylated fatty alcohol, alkoxylated triglyceride, mono-, di, tri-ester of alkoxylated triglyceride, alkoxylated polyhydric alcohol or esters thereof, or polyether carboxylate or esters thereof.

12. A solvent free, diluent free, liquid hydrocarbon soluble colorant comprising:
    a chromophore;
    an oleophilic binder; and
    an alcohol including a carbon chain having a carbon chain from between C3–C30.

13. The colorant set forth in claim 12, wherein said chromophore is selected from the group consisting of azo, TPM, methine, anthraquinone, or any combination thereof.

14. The colorant set forth in claim 12, wherein said oleophilic binder is Indopol L-14 or polybutene.

15. A solvent free, diluent free, liquid hydrocarbon soluble colorant comprising:
    a chromophore;
    an oleophilic binder; and
    at least one reactive group selected from the group consisting of alkoxylated alcohol, fatty acid, amine, amide, ester of alkoxylated fatty alcohol, alkoxylated triglyceride, mono-, di, tri-ester of alkoxylated triglyceride, alkoxylated polyhydric alcohol or esters thereof, or polyether carboxylate or esters thereof.

16. The colorant set forth in claim 15, wherein said chromophore is selected from the group consisting of azo, TPM, methine, anthraquinone, or any combination thereof.

17. The colorant set forth in claim 15, wherein said oleophilic binder is Indopol L-14 or polybutene.

* * * * *